Patented Dec. 18, 1951

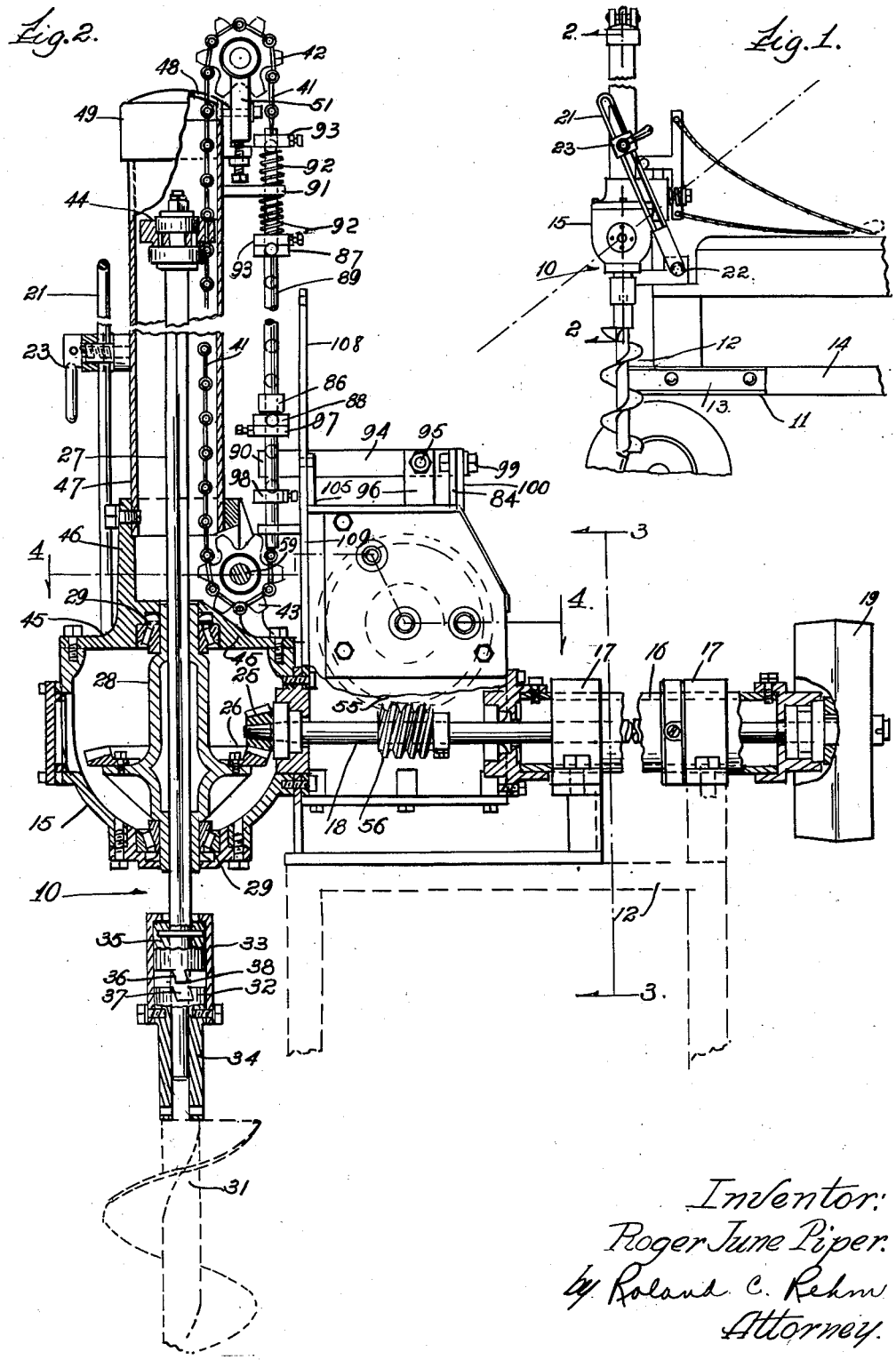

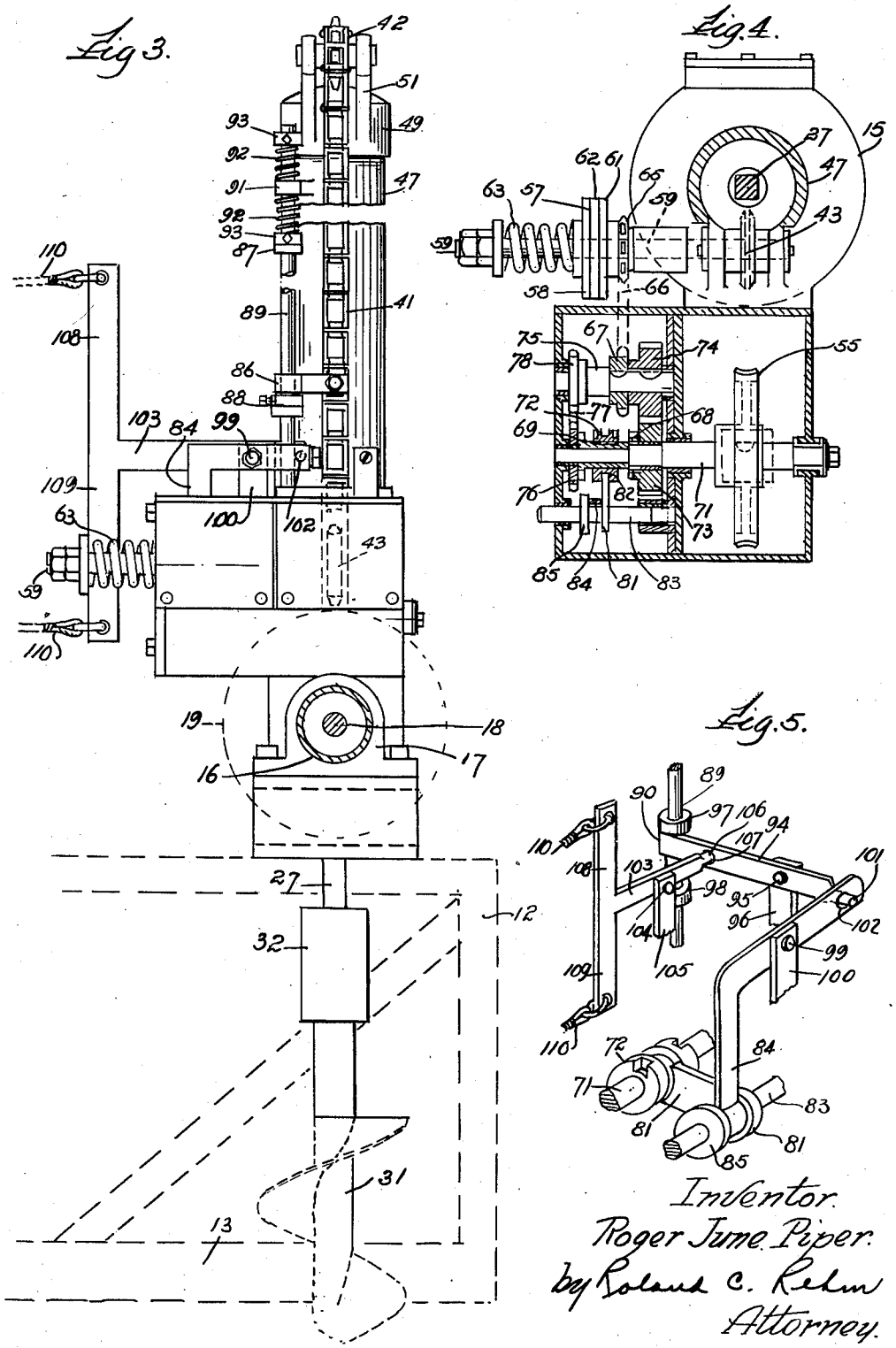

2,578,834

UNITED STATES PATENT OFFICE 2,578,834

ATTACHMENT FOR DIGGING POSTHOLES AND THE LIKE

Roger June Piper, Princeton, Ill.

Application May 7, 1948, Serial No. 25,733

2 Claims. (Cl. 255—19)

The invention relates to apparatus for digging postholes and the like, and among other objects aims to provide improved apparatus designed for attachment to tractors, trucks and other vehicles and to be driven by power therefrom.

Another object aims to provide a novel and improved means for applying feeding pressure to the auger and for retracting or elevating the auger.

A further object aims to provide means for automatically regulating hole depth and for automatically interrupting downward feeding of the auger and also for arresting the retracting or elevating movement.

A still further object is to provide simple and easily operated controls to make it possible for the vehicle driver alone conveniently and easily to operate both the vehicle and the digging apparatus.

Other objects and advantages of the invention will be apparent from the following description of one illustrative apparatus embodying the invention and shown in the accompanying drawings.

In said drawings:

Fig. 1 is an elevation of one form of tractor carrying a rotary digging apparatus removably attached to its front end;

Fig. 2 is a rear elevation of the digging apparatus taken approximately from the plane 2—2 of Fig. 1;

Fig. 3 is a side elevation of the digging apparatus taken from the plane 3—3 of Fig. 2;

Fig. 4 is a plan section taken on the plane 4—4 of Fig. 2; and

Fig. 5 is a diagram showing a lever system for automatic and manual operation of the feeding and retracting apparatus.

Apparatus of this character depends for its practical utility on the circumstance that it may be easily attached to and driven by the power take-off of, the vehicle, such as truck, tractor and the like, from which it may be detached when no longer required, leaving the vehicle free for other uses.

In the illustrative apparatus control and operation of the rotary digger attachment is simplified and improved to permit easy and convenient operation thereof and of the vehicle, by one man. This is of the greatest practical importance for ranches, and farms where often not more than one man is available; and in any event cost per hole dug is greatly reduced when the entire operation of digging a series of holes may be performed conveniently and easily by one man.

The general nature of the rotary digging attachment and its relation to the truck or other vehicle to which it is removably attached, has been fully described in my prior Patents 2,250,081 and 2,384,557; and a general description of the common subject matter will suffice here.

The digging apparatus 10 is here shown attached to the front end of a conventional farm tractor 11, but it will be understood that it is adapted for attachment to other types of vehicles such as trucks, both at the front and rear ends. In the present instance, the attaching structure comprises a frame 12 having a pair of channel irons 13 which extend to the rear and are removably bolted to the side frame 14 of the tractor. The housing 15 of the digger carries a laterally projecting tubular shaft housing 16 pivotally supported, in this case transversely of the tractor, in trunnions 17 mounted on the upper portion of frame 12. Drive shaft 18 extending longitudinally through and mounted co-axially in bearings in, housing 16, carries keyed adjacent its end, pulley 19 belt driven from the conventional power take-off pulley of the tractor.

The digger may be pivoted or tilted in its trunnions both for the purpose of transport from place to place and to regulate the angle of the auger shaft in relation to the inclination of the tractor. This is particularly useful when it becomes necessary to dig a vertical hole on a hillside where the body of the tractor is inclined from the horizontal. The digger housing and its associated mechanism is carried at one end of tubular housing 16 to project beyond the side of the frame to permit the swinging and tilting action above described. The digger is held in its tilted adjustment by a slotted link 21 pivoted at 22 to the frame 12 and engaged by releasable clamp 23 on the digger (Fig. 1). In swinging the housing 15 it pivots with the tubular housing 16 in bearings 17 to the desired position where it is held by engaging clamp 23.

The opposite end of shaft 18 carries a bevel pinion 25 meshing with a bevel ring gear 26 through which auger shaft 27 is free to slide but not to rotate relative thereto. In the present instance, this slidable, non-rotative relation is effected by a shaft of non-circular (in this instance square) section and a correspondingly shaped passage in the hub 28 of the ring gear. The latter hub is mounted in roller bearings 29 carried by the housing 15.

Auger 31 is advantageously connected to auger shaft by a coupling 32 embodying a clutch adapted automatically to release rotative engagement with the auger when the auger shaft is elevated. In the present instance the coupling comprises a sleeve 33 bolted to auger socket 34. Auger shaft 27 projects into the sleeve but, in unclutched position, is rotatably free thereof. Auger shaft carries a clutch member 35 provided with one or more clutch teeth 36 adapted to enter correspondingly shaped recesses 37 in auger socket 34 to rotate the latter. Sleeve 33 is sufficiently long to allow separation between auger shaft clutch member 35 and auger socket 37, which occurs when auger shaft is elevated to permit the weight of the auger to disengage the clutch teeth. On lowering the auger shaft engagement of the clutch teeth occurs when the auger strikes the ground. Preferably clutch teeth 36 and socket 37 are slightly beveled as at 38 to develop an axial component of force to draw the clutch teeth completely into the recess 37 after initial engagement therewith. When the auger shaft is elevated the clutch elements are disengaged and rotation of the auger ceases. This insures pulling to the surface the earth remaining in the auger.

The auger shaft 27 and with it the auger is fed down and then retracted on completion of the hole, by feeding means here shown in the form of a sprocket chain 41 whose vertical flight is somewhat greater than the maximum longitudinal travel of the auger and its shaft. Sprocket chain 41 travels around upper and lower sprockets 42 and 43 carried by the digger housing. The upper end of the auger shaft is connected at its top with the adjacent flight of the chain by an appropriate clamp 44 (Fig. 2). In the present instance lower sprocket 43 is mounted fast on a transverse shaft 59 carried on the cover 45 of housing 15 (see Fig. 4). The cover is also provided with an annular flange 46 in which is seated a tubular housing 47 surrounding the shaft 27 and the adjacent flight of the sprocket chain. The latter emerges from an opening 48 in the housing cap 49. The latter carries bracket 51 in which is mounted the shaft for sprocket 42 (Figs. 2 and 3). Chain 41 emerges from the open lower end of tubular housing 47 to pass around lower sprocket 43.

The latter sprocket is clutch driven in either direction by shaft 18 to apply feeding pressure for advancing the auger and later to elevate or retract it. The clutch driving mechanism is here represented by worm gear 55 driven by worm 56 on shaft 18. The worm gear drives sprocket 43 through friction clutch 57 and a reversing mechanism presently described (Fig. 4). Clutch 57 comprises a driven spring loaded friction disc 58 fast on sprocket shaft 59, a driving disc 61, and an intervening free running friction disc 62. A spring 63 carried on shaft 59 exerts sufficient pressure to maintain a friction driving connection between the driving and driven discs through the intervening disc 62. This permits relative slipping between the discs to relieve overload and prevent breakage in the event an obstacle is encountered by the auger or otherwise. Driving disc 61 is fast on the hub of sprocket 65 which is co-axial with shaft 59 but otherwise free thereon. Sprocket 65 is driven by sprocket chain 66 from driving sprocket 67 of the aforesaid reversing mechanism.

The reversing mechanism is here represented by positive clutch members 68 and 69 free on worm gear shaft 71 having between them a sliding clutch member 72 splined to driving shaft 71 and adapted selectively to connect the respective clutch members 68 and 69 with shaft 71. Clutch member 68 is carried on the hub of spur gear 73 on shaft 71 but otherwise unconnected therewith and meshing with spur gear 74 to the hub of which is connected driving sprocket 67 fast on shaft 75. Clutch member 69 is in this instance carried on sprocket 76 free on shaft 71 and adapted to drive through chain 77, the sprocket 78 fast on shaft 75. When sliding clutch 72 is shifted to connect with sprocket 76 the latter rotates sprocket 67 in the same direction as that of worm gear shaft 71; but when the clutch is shifted in the opposite direction to engage spur gear 73, sprocket 67 is rotated in the direction opposite to that of shaft 71. Thus auger shaft operating sprocket 43 may be selectively driven either to raise auger shaft or to feed it downwardly with the desired pressure. The friction clutch functions to protect the apparatus against excessive stress which would otherwise develop by excessive resistance to downward feeding or raising the auger, due to obstacles of some sort.

The power trains for raising and lowering the auger are summarized thus: Referring particularly to Figs. 2 and 4, drive shaft 18 rotates worm gear 55 which through the reversing mechanism just described drives sprocket 43. The latter drives sprocket chain 41 to raise and lower the auger. When the sliding clutch member 72 is shifted as above described into operative engagement with clutch member 69 (which is fast on sprocket 76) the latter rotates shaft 75 through chain 77 and sprocket 78, the latter being fast on shaft 75. Sprocket 67 also being fast on shaft 75, drives sprocket 65, and through the friction clutch discs 58, 61 and 62, drives the aforesaid sprocket 43 on shaft 59. Spur gears 74 and 73 (the former fastened to sprocket 67) are driven, but their rotation is idle.

Sprocket 43 and chain 41 are moved in the opposite direction when clutch member 72 is shifted in the opposite direction to engage clutch member 68 to drive the aforesaid spur gear 73. The latter now rotates sprocket 67 in the opposite direction (through spur gear 74). Thus sprockets 65 and 43 and chain 41 are driven in the opposite direction to reverse the movement of the auger. During such reverse movement sprockets 78 and 76 are idly driven.

Clutch 72 is shifted either to neutral position or to selective engagement with clutch elements 68 and 69 by shifter fork 81 traveling in the groove 82 in the clutch and mounted on shifter rod 83. The latter is shifted longitudinally to operate the clutch fork by lever 84 projecting between fork 81 and a retaining element 85 on rod 83. Clutch shifting lever 84 is operated to shift the clutch automatically to neutral position by a stop 86 carried on the outer flight of sprocket chain 41 (Figs. 2 and 3). The stop travels between adjustable stops or collars 87 and 88 carried on rod 89 in this instance adjacent the outer run of the sprocket chain. Collars 87 and 88 are separated by a distance representing the maximum desired longitudinal travel of the chain and the auger. The adjustment of the upper collar 87 on rod 89 determines the depth of the hole, and the adjustment of collar 88 on the rod determines the limit of upward travel of the auger. Variation in depth of the hole and the limit of auger retraction may be effected by shifting the respective collars on rod 89.

The lower end of rod 89 is slidably carried by housing 15 and its upper end passes through a bracket 91 carried by tubular housing 47. Springs 92 above and below the latter bracket and confined by stops 93 on the rod cushion the clutch operating mechanism from impact of the stop 86 with collars 87 or 88. They also permit sufficient longitudinal movement of rod 89 for operation of clutch shifting lever 84, as next described.

One simple mechanism for transmitting operating movement to the clutch is represented by the lever mechanism illustrated diagrammatically in Fig. 5 and detailed also in Figs. 2, 3 and 4. As there shown one end 90 of terminal lever 94 pivoted at 95 through bracket 96 on housing 15, projects between stop collars 97 and 98 on rod 89, and is moved thereby when the rod is actuated as above described. Such movement is sufficient to shift the clutch 72 to neutral position. There is insufficient momentum in the longitudinal movement of the shaft or its operating mechanism to carry the clutch 72 past neutral position. Movement of lever 94 is transmitted to clutch 72 by lever 84 which is here shown in the form of a bell-crank pivoted at 99 to bracket 100. In the present instance levers 84 and 94 are operatively connected by projecting one through a loose opening in the other. As here shown, the stud 101 at the extremity of lever 94 projects through a loose opening 102 in the horizontal arm of lever 84.

Clutch 72 is advantageously manually operated to lower or raise the auger shaft either from the upper or lower terminal position or at any desired point intermediate the limits of its travel. As here shown, a lever 103, pivoted at 104 to bracket 105, is operatively connected to lever 94. Such connection may advantageously be similar to the connection of levers 84 and 94. In this case the stud 106 on lever 103 projects through a loose opening 107 in lever 94. Lever 103 is provided with oppositely extending bell crank arms 108 and 109 so that it may be rocked in either direction by flexible connections, e. g. ropes 110, connected to the ends of the respective arms and extending to the driver's position.

The power for advancing the auger or feeding it downward as well as elevating it is thus supplied by the tractor engine, thereby relieving the operator of this arduous task. The auger is moved to the adjusted limits of its downward and upward travel, whereupon further travel is automatically arrested, thereby relieving the operator of the necessity of continuous attention during operation of the auger. Movement is inaugurated in the opposite direction by manual operation of the clutch as described above.

In ordinary operations on level ground the auger and its housing need not be tilted to idle position until completion of the drilling of the series of holes. The vehicle or tractor may be operated in the line of the desired series of holes and advanced from one hole to the next by the tractor driver. The hole may be dug and the auger retracted while the tractor driver remains in his seat. It is thus possible for a single man to operate both the tractor and the digging apparatus, thereby substantially reducing drilling costs.

Obviously the invention is not limited to the details of the illustrative apparatus, since these may be variously modified. Moreover it is not indispensable that all features of the invention be used conjointly, since various features may be used to advantage in different combinations and sub-combinations.

Having described my invention, I claim:

1. In a hole digging attachment for tractors and the like having a power take-off, the combination comprising a transversely extending horizontal power shaft driven from the power take-off, an axially tiltable shaft housing coaxial with said shaft, a rotary earth auger including an auger shaft carried by said housing and driven by said power shaft and vertically slidable relative thereto, a sprocket chain having a flight extending parallel and adjacent said auger shaft and connected thereto for raising and lowering said shaft and its auger, a sprocket driven from said power shaft for moving said chain, mechanism mounted on said housing and tiltable therewith for driving said sprocket from said power shaft including a reversing drive having forward, reverse and neutral positions, a longitudinally movable reversing drive operating rod generally parallel and adjacent said chain and carrying adjustable stops, means connecting said rod with said clutch for operating the latter upon longitudinal movement of said rod, and a projection carried by said chain and adapted to engage said stops alternately for moving said rod to shift said clutch into neutral position.

2. In a hole digging attachment for tractors and the like having a power take-off, the combination comprising a transversely extending horizontal power shaft driven from the power take-off, an axially tiltable shaft housing coaxial with said shaft, a rotary earth auger including an auger shaft carried by said housing and driven by said power shaft and vertically slidable relative thereto, a sprocket chain having a flight extending parallel and adjacent said auger shaft and connected thereto for raising and lowering said shaft and its auger, a driving sprocket about which said chain passes and mounted on said housing and tiltable therewith, mechanism mounted on said housing and tiltable therewith for driving said sprocket from said power shaft, said mechanism including a reversing drive having forward, reverse and neutral positions, a longitudinally movable reversing drive operating rod generally parallel and adjacent said chain and carrying adjustable stops, means connecting said rod with said clutch for operating the latter upon longitudinal movement of said rod, and a projection carried by said chain and adapted to engage said stops alternately for moving said rod to shift said clutch into neutral position, said mechanism including an over-load clutch adapted to slip in the event of excessive resistance to vertical movement of said auger.

ROGER JUNE PIPER.

REFERENCES CITED

The following references are of record in the file of this patent:

UNITED STATES PATENTS

| Number | Name | Date |
|---|---|---|
| 1,000,578 | Burdette | Aug. 15, 1911 |
| 1,397,324 | Moore | Nov. 15, 1921 |
| 1,409,394 | Moore | Mar. 14, 1922 |
| 1,540,682 | Dreher et al. | June 2, 1925 |
| 2,230,757 | Long | Feb. 4, 1941 |
| 2,250,081 | Piper | July 22, 1941 |
| 2,384,557 | Piper | Sept. 11, 1945 |
| 2,418,601 | Richards | Apr. 8, 1947 |